Sept. 5, 1950  B. DYSART  2,521,507
REGULATOR CIRCUIT
Filed April 12, 1946

INVENTOR
B. DYSART
BY
ATTORNEY

Patented Sept. 5, 1950

2,521,507

UNITED STATES PATENT OFFICE 2,521,507

REGULATOR CIRCUIT

Birney Dysart, Florham Park, Madison, N. J., assignor to Bell Telephone Laboratories, Incorporated, New York, N. Y., a corporation of New York Application April 12, 1946, Serial No. 661,497

9 Claims. (Cl. 178—44)

This invention relates to electrical wave transmission systems and more particularly to the regulation of transmission over such systems.

An object of the invention is to improve and facilitate transmission regulation.

A more specific object of the invention is to permit the temporary removal of certain elements of the transmission regulation equipment without impairing the overall operation of the wave transmission system.

In present day long transmission systems such, for example, as a broad band coaxial system, it is customary to provide at some, or all, of the separated repeater points of the system equipment for transmission regulation, i. e., for compensating for certain variations in the line which in the absence of such regulators would result in variations in the level of the transmitted signals. Variations of the nature referred to may be due, for example, to the effect on the line of temperature changes. Some, or all, of these transmission regulators are customarily of the automatic or so-called dynamic type and operate under general control of pilot frequencies, or "pilots", transmitted over the line. By way of example, a disclosure of such an automatic transmission regulator is found in Patent 2,179,915 issued November 14, 1939 to R. R. Blair.

In the operation of a system of the type referred to, it may be desirable on occasion to remove a dynamic regulator from the system for maintenance purposes, repair or replacement and it is desirable, of course, that in such case the overall operation of the transmission system may be unimpaired and uninterrupted.

A feature of the present invention resides in means whereby an automatic regulator may be removed from the system and the function thereof assumed by a manually controlled regulator without interfering with the normal operation of the system.

A further feature of the invention resides in means whereby the manual control is gradually "faded" into the system while the automatic regulator is correspondingly faded out until the point is reached at which the entire regulation function is assumed by the manual regulator whereupon the dynamic regulator may be removed without effect on the overall system.

According to another feature of the invention, the process just referred to is reversible whereby an automatic regulator may be gradually faded into the system.

A still further feature of the invention is the utilization of a regulating alternating current and a regulating direct current applied over a common path and the provision of means included in said path for electrically segregating said alternating current and said direct current in said common path.

Dynamic regulators of the type referred to ordinarily act under control of a pilot current to supply regulating current, for example at a frequency of the order of 2 kilocycles, to the heater of the regulating element per se; this element, which may be a thermistor, may be included in the beta circuit of the amplifier itself or may comprise the variable resistance element of a variable transmission equalizer. A system in which a regulator of the latter type is utilized is disclosed in the copending application of E. I. Green, filed June 8, 1945, Serial No. 598,267, entitled Transmission Control System, now Patent No. 2,465,531, issued March 29, 1949.

A dynamic regulator of the type referred to is utilized to supply regulating current to a plurality of networks associated with a variable transmission equalizer connected for regulating purposes at the output of an amplifier located at a main repeater point in a broad band coaxial transmission system.

In accordance with features of the present invention the regulating action of the dynamic regulator applied to at least one of the networks is supplemented by a source of direct current and manually regulated means under control of which current from said source may be applied in regulated magnitudes to the thermistor element of said network in connection with the regulating alternating current. The direct current and alternating current are applied over a common path to the thermistor, a filtering means being provided in the path for proper segregation of the currents. When preparing to remove a dynamic regulator, regulating current is applied to the regulating element in gradually increasing magnitudes, under control of manual adjusting means, with a corresponding gradual decrease of the regulating current supplied by the dynamic regulator until finally the entire control is taken over by the direct current whereupon the dynamic regulator may be removed from the system without affecting transmission thereover. When replacing a dynamic regulator in the system the process is reversed, i. e., the direct current source is gradually faded out with a corresponding fading-in of the dynamic regulator.

If desired, the manually controlled regulator may utilize, instead of a direct current source, a source of alternating current, proper means being provided to prevent the two sources, i. e., the dynamic regulator and the manually controlled regulator, from short-circuiting each other. In accordance with one such arrangement, selected for illustration by way of example only, the separation of the two alternating current sources is facilitated by the fact that the frequencies of the two currents differ. That is, in cases where the dynamic regulator supplies alternating current at a frequency in the neighborhood of 2 kilocycles, the manually controlled regulator may utilize alternating current at a frequency in the neighborhood of 60 cycles. It will be understood, however, that the frequency of the two sources may be the same, it being necessary only, as stated before, to properly segregate the two currents, or prevent material short-circuiting by having each source a high impedance.

In accordance with common usage the frequency magnitudes are expressed with reference to seconds as a time base, i. e., "2 kilocycles" should be taken to mean 2 kilocycles per second; "60 cycles" to mean 60 cycles per second and so on.

A full understanding of the arrangements contemplated by the present invention and of the various desirable features thereof may be gained from consideration of the following detailed description and the accompanying drawings in which.

Figure 1:
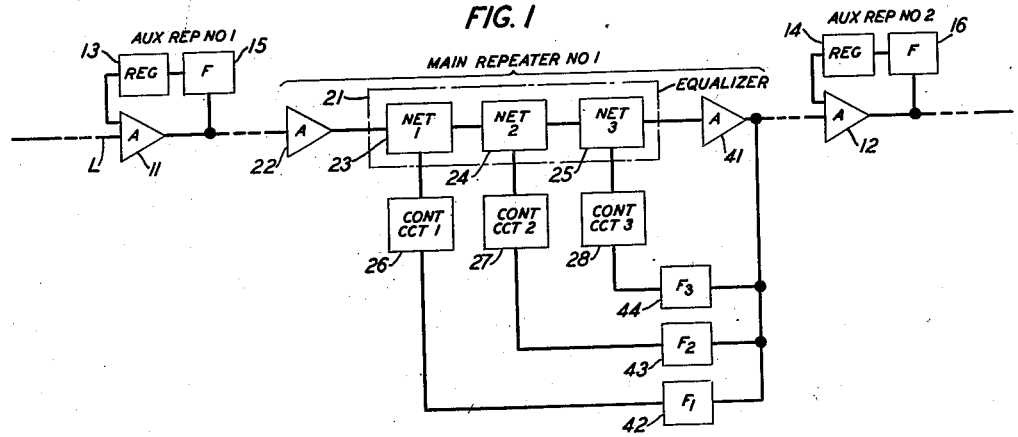
Fig. 1 illustrates in schematic form a portion of a wide band transmission system including one main repeater station and two auxiliary repeater stations.

Referring now to the drawings, and first to Fig. 1, there is illustrated a portion of a broad band coaxial system including one main repeater station and two auxiliary repeater stations. Main repeater stations, which are normally attended, may be of the order of 50 miles apart (and this may also be the approximate distance between the terminal and the first main repeater) while the auxiliary repeater stations, which are normally unattended, may be of the order of 5 miles apart. There are usually two amplifiers at each repeater point, one for each direction of transmission. (In Fig. 1 only one amplifier of each such pair of amplifiers is illustrated.) These amplifiers are for transmission under normal conditions and, in addition, one or more amplifiers may be provided at some or all of the stations for emergency purposes.

It is usual to provide at each auxiliary repeater (and also at the main repeaters although in order to avoid unnecessary complication of the drawing it has not been so illustrated in Fig. 1) means for compensating for changes of cable attenuation with temperature variations. A pilot current of a predetermined frequency, which we will designate $f_p$ and which may be, by way of example, 2064 kilocycles per second, is applied to line L for this purpose together with the message currents and the other pilot currents of different frequencies.

As shown, amplifier 11 of auxiliary repeater No. 1 and amplifier 12 of auxiliary repeater No. 2 each has associated therewith a regulator, regulators 13 and 14, respectively. These regulators operate under control of the pilot current $f_p$, applied thereto through band-pass filters 15 and 16, respectively, to supply regulating current to a regulating element associated with the respective amplifiers. For example, this regulating current may be applied to the heater winding of a thermistor included in the beta circuit of the amplifier itself; an arrangement of this general nature is disclosed in patent 2,179,915 issued November 14, 1939 to R. R. Blair.

At main repeater No. 1 there is provided for regulating purposes variable transmission equalizer 21, this being in addition to certain other regulators which may be associated with amplifier 22.

Equalizer 21 is intended to provide compensation for deviations which may accumulate in the section of line L extending between the terminal (or the preceding main repeater if there be such) and main repeater No. 1 due to such factors as manufacturing deviations in component parts of the line section, aging of the amplifiers, effects of variations in alternating current power, differences of repeater temperatures from average and regulation errors. The equalizer comprises three variable networks 23, 24 and 25; these networks may be of the general type disclosed in the article "Variable Equalizers" (Fig. 7, page 238) by H. W. Bode; Bell System Technical Journal, April 1938, and each include a thermistor as the variable resistance element. Changes in temperature of the thermistor associated with a respective network are effective to cause corresponding changes in the transmission loss of the equalizer, each network, of course, being effective over the general frequency range represented by its respective pilot. Equalizer 21 may be looked upon therefore as a variable loss transmission element with a plurality of separate control means or control circuits, namely networks 23, 24 and 25.

The loss of networks 23, 24 and 25 and, correspondingly, the transmission loss of equalizer 21 is controlled by three pilot currents of respectively different frequencies which we will designate $f_{p1}$, $f_{p2}$ and $f_{p3}$. These pilot currents are applied to the respective control circuits 26, 27 and 28 (after passing through flat-gain amplifier 41) through respective band-pass filters 42, 43 and 44. These band-pass filters are each designed to pass only a narrow band of frequencies which, in each instance, includes the respective pilot frequency referred to, i. e. filter 42 passes $f_{p1}$; filter 43 passes $f_{p2}$ and filter 44 passes $f_{p3}$. Each of the control circuits includes a dynamic regulator which preferably is of the general type which includes a selective amplifier-rectifier which generates a direct current bias utilized to control the output of a voice frequency oscillator. The output of the oscillator, varying as the respective pilot varies, is applied to the heater winding of the thermistor associated with the respective variable network of equalizer 21. The regulating current is supplied to the heater winding at a predetermined frequency which we will assume is, in the present instance, 2 kilocycles. This is by way of example for purposes of illustration only and it is obvious that other frequencies may be utilized in different systems.

Patent 2,179,915 mentioned above may be referred to for a more detailed description of the dynamic regulator, particularly with respect to the characteristics and operation of the oscillator. For the present purpose it should be observed that the regulator is of a general type that is commonly referred to as "back acting". That is, the regulator being connected at the output of the regulating equalizer, which in turn is connected directly in the line, is responsive to changes in the amplitude of the pilot current as passed by the equalizer regardless of whether such changes be caused by changes in line characteristics or by changes intentionally produced in the equalizer characteristics, for example by the action of a second regulator now to be described.

As pointed out above, it sometimes becomes desirable to temporarily remove a dynamic regulator from service for maintenance or replacement and it is highly desirable, of course, in such cases that no interruption of, or interference with, signal transmission over the system as a whole result. To render this possible there is provided, in accordance with features of the present invention, a second regulating means, this second regulating means utilizing a direct current source with manual control thereof.

Figure 2:
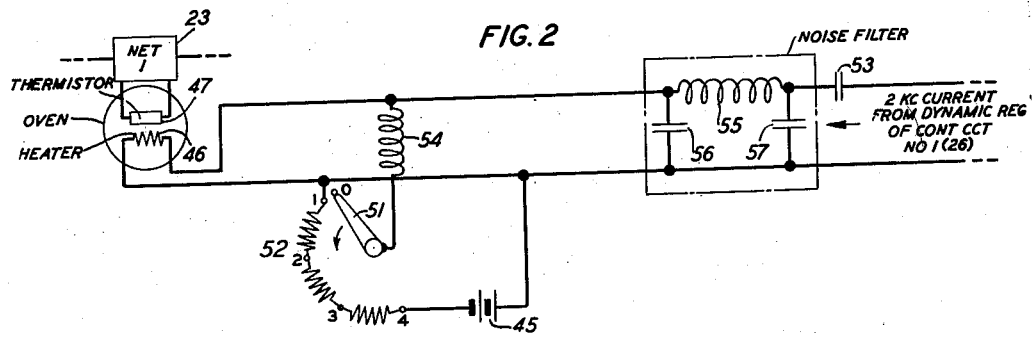
Fig. 2 shows in greater detail the arrangement of the direct current regulator associated with one of the networks of the main repeater illustrated in Fig. 1.

Referring now to Fig. 2 there is illustrated in detail the manually controlled, direct current regulator which is provided for supplementing or replacing the alternating current regulation applied to network 23 of equalizer 21. (It will be understood that such a direct current regulator may be associated with each of the variable networks of the equalizer.) The direct current regulator, when provided, is a part of the control circuit associated with the network, i. e. in the present case the direct current regulator is provided as a part of control circuit 26.

As illustrated in Fig. 2, a direct current source, battery 45, is connected to one side of the line leading from the output of the dynamic regulator of control circuit 26. Normally, i. e. when control is fully exercised by the dynamic regulator, no current from this source is applied to heater winding 46 of thermistor 47. On occasion, however, i. e. when preparing to remove the dynamic regulator, slider arrm 51 of potentiometer 52 is moved from its normal position on contact 0 to contact 1 and thence gradually around to contact 4 thereby supplying gradually increasing amounts of direct current to heater winding 46. Now this increasing amount of current supplied to heater winding 46 will, of course, correspondingly decrease the resistance of thermistor 47 and thereby correspondingly decrease the transmission loss of equalizer 21. Now, remembering that the dynamic regulator is back acting and responsive to the equalizer output, we see that the alternating current supplied by the dynamic regulator will gradually drop off, as the regulator "perceives" the decrease in equalizer loss and will attempt to compensate it, until the point is reached at which the dynamic regulator has no further control of the equalizer loss whereupon it (dynamic regulator) may be removed from the system and the entire control be left to the direct current regulator.

Obviously, some means must be provided to prevent short-circuiting the alternating current path when the direct current path is cut-in and, in accordance with features of the present invention, a low-pass filter is provided for this purpose. This low-pass filter comprises condenser 53 connected in series with one side of the alternating current supply line and inductance 54 which, when slider 51 is moved to a "live" contact of potentiometer 52, is connected in shunt to the line. The characteristics of the filter elements are so fixed that the filter has a cut-off point below the frequency of the regulating alternating current which, in the present instance, has been fixed for purposes of illustration at 2 kilocycles.

In addition to the low-pass filter described, a noise filter, comprising inductance 55 and condensers 56 and 57, may be provided for elimination of interference due to "noise" currents.

After removal of the dynamic regulator, slider arm 51 may be adjusted as necessary to provide the required regulation of equalizer 21.

The above-described process may be reversed when replacing the dynamic regulator in the system, i. e., gradual fading out of the direct current regulator with a corresponding fading in of the dynamic regulator until full control is reassumed by the latter.

Figure 3:
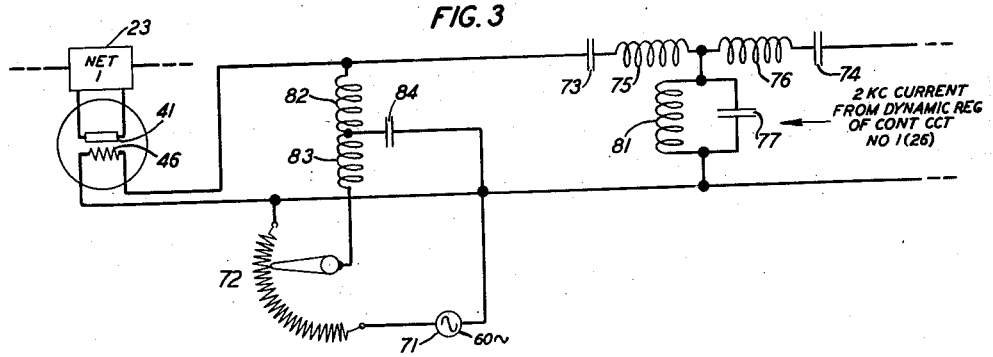
Fig. 3 shows the arrangement of a regulator serving the same purpose as the direct current regulator of Fig. 2 but utilizing alternating current of low frequency instead of direct current.

Referring now to Fig. 3 there is illustrated a modification of the arrangement of Fig. 2 in accordance with which the supplementary, manually controlled regulator utilizes instead of direct current, a regulating alternating current supplied from source 71. In accordance with this specific embodiment of the modification, the frequency of the manually controlled alternating current is different than that supplied by the dynamic regulator and is assumed, by way of example, to be in the case illustrated 60 cycles, the frequency of the current supplied by the dynamic regulator being assumed to be 2 kilocycles as before. The arrangement of Fig. 3 operates in the same general manner as that of Fig. 2 and need not be described in detail. It will be observed, however, that the circuit of Fig. 3 utilizes, for purposes of proper segregation of the two regulating currents, both a band-pass and a low-pass filter. The band-pass filter, which comprises, as series element, condensers 73 and 74 and inductances 75 and 76 and, as shunt elements, condenser 77 and inductance 81, is designed to pass only a narrow band of frequencies, which band includes 2 kilocycles, while the low-pass filter, which comprises inductances 82 and 83 and condenser 84, is designed to have a cut-off point above 60 cycles but well below 2 kilocycles. Proper segregation of the two regulating currents is thereby provided as in the instance of the arrangement of Fig. 2 described in detail above.

While particular embodiments of the invention have been selected for detailed description, the invention is not, of course, limited in its application to such embodiments. For example, it will be understood that particular frequencies have been specified by way of example only and that different frequencies may be utilized. It will be understood, further, that the regulating currents may be applied to other elements of the system, for example, to the beta paths of the amplifiers themselves. In short, the embodiments described should be taken as illustrative of the invention and not as restrictive thereof.

What is claimed is:

1. The combination, with a signal transmission line having a variable transmission element therein, of means responsive to temperature changes associated with said variable transmission element for controlling the transmission gain or loss thereof, a heater circuit for said temperature change responsive means, a source of alternating current, means for varying the magnitude of said alternating current in accordance with changes in the gain or loss of said variable transmission element, and a circuit for supplying said alternating current to said heater circuit, of a source of regulating current, means for connecting said source of regulating current in shunt to said alternating current supply circuit for supply of said regulating current to said heater circuit in common with the supply of said alternating current, manually controlled means for varying the magnitude of said regulating current supplied to said heater circuit whereby to correspondingly vary the gain or loss of said variable transmission element and to vary inversely therewith the magnitude of said alternating current, and means connected in said supply circuit for electrically segregating said alternating current and said regulating current.

2. In combination with a signal transmission line having a variable transmission element therein, temperature responsive means associated with said variable transmission element for controlling the transmission gain or loss thereof, a heater circuit for said temperature responsive means, a source of regulating alternating current supplied at a predetermined frequency, means for varying the magnitude of said alternating current in accordance with changes in the gain or loss of said variable transmission element, and a circuit for supplying said alternating current to said heater circuit, of a source of regulating direct current, means for connecting said source of regulating direct current in shunt to said alternating current supply circuit for supply of said direct current to said heater circuit in common with the supply of said alternating current, manually controlled means for varying the magnitude of said regulating direct current supplied to said heater circuit whereby to correspondingly vary the gain or loss of said variable transmission element and the magnitude of said alternating current, and a high-pass filter connected in said supply circuit between said alternating current and said direct current sources, said filter having a cut-off point below said predetermined frequency at which said regulating alternating current is supplied.

3. The combination, with a signal transmission line, an amplifier in said line having a beta circuit, means including a thermistor connected in said beta circuit for controlling the gain of said amplifier, a heater circuit for said thermistor, a source of regulating alternating current supplied at a predetermined frequency, means for varying the magnitude of said alternating current in accordance with changes in the gain of said amplifier, and a circuit for supplying said alternating current to said heater circuit, of a source of regulating direct current, means for connecting said source of regulating direct current in shunt with said alternating current supply circuit, manually controlled means for varying the magnitude of said regulating direct current supplied to said heater circuit whereby to change inversely the gain of said amplifier and the magnitude of said alternating current, and a high-pass filter connected in said supply circuit between said alternating current and said direct current sources, said filter having a cut-off point below said predetermined frequency of said regulating alternating current.

4. The combination, with a signal transmission line, a variable transmission element in said line, means responsive to temperature changes associated with said transmission element for controlling the transmission gain or loss thereof, a heater circuit for said temperature change responsive means, a first source of regulating alternating current, means for varying the magnitude of said alternating current in accordance with changes in the gain or loss of said variable transmission element, and a circuit for supplying said alternating current to said heater circuit, of a second source of regulating alternating current, means for connecting said second source of regulating alternating current in shunt to said alternating current supply circuit for supply of said second alternating current to said heater circuit in common with the supply of said first alternating current, manually controlled means for varying the magnitude of said second alternating current supplied to said heater circuit whereby to vary inversely therewith the transmission gain or loss of said variable transmission element and the magnitude of said first alternating current, and means connected in said supply circuit for electrically segregating said first alternating current and said second alternating current.

5. The combination, with a signal transmission line repeater station having means including a dynamic regulator for automatically maintaining the transmission level from said station within desired limits, of means for permitting the disconnection of said dynamic regulator without interruption of the transmission from said repeater station, comprising means for applying an auxiliary control current in parallel with the output of said dynamic regulator, a filter arranged to prevent said auxiliary control current from feeding back directly into said dynamic regulator and to prevent said means for applying auxiliary control current from acting as a short circuit across said dynamic regulator, and means for changing said auxiliary control current gradually, whereby the output of said dynamic regulator may be inversely changed to permit connection and disconnection of said regulator without affecting the transmission level.

6. The combination, with a signal transmission line having a dynamic regulator and a variable transmission equalizer the gain of which may be controlled by current from said dynamic regulator, of means for permitting removal of said dynamic regulator without interrupting transmission on said line, comprising a separate source of regulating current, means for connecting said source of separate regulating current in parallel with said dynamic regulator to said variable transmission equalizer, means for preventing said regulating current from affecting said dynamic regulator directly, and means for gradually varying the regulating current from said separate source to said variable transmission equalizer.

7. In a signal transmission line repeater having a dynamic regulator and a variable transmission equalizer of which the gain may be controlled by current from said regulator, the method of removing said dynamic regulator without interfering with signals passing over said line which comprises introducing an auxiliary regulating current in parallel with said regulator, increasing the auxiliary regulating current gradually to permit continuous maintenance of the transmission level by said dynamic regulator while changing the proportions of control attributable to said auxiliary current and to said dynamic regulator, continuing the increasing of said auxiliary regulating current until control current from said dynamic regulator has become so small as to be negligible in its effect on the gain of said equalizer, and disconnecting said regulator.

8. In a repeater station having a transmission equalizing network controllable by current from a dynamic regulator to maintain a desired output level, the method of removing said dynamic regulator from the circuit without interfering with service through said repeater station which comprises applying an auxiliary regulating current to said network together with that from said dynamic regulator, preventing direct reaction of said auxiliary regulating current on said dynamic regulator, gradually changing the amount of auxiliary regulating current supplied, permitting the gradual change of current supplied by said dynamic regulator, increasing the auxiliary regulating current until the current supplied by the dynamic regulator is ineffective to affect the equalizing network, and disconnecting said regulator.

9. In a transmission line having a repeater station, a transmission equalizing network the gain of which is controllable by means of current from a dynamic regulator to maintain a desired level of transmission on said line, the method of inserting or removing a dynamic regulator from the circuit without interfering with said desired level of transmission which comprises connecting an auxiliary source of regulating current to that portion of said network adapted to be controlled by current from a dynamic regulator, preventing current from said auxiliary source from reacting directly on said dynamic regulator, and the current output of said auxiliary source gradually to permit resultant gradual inverse variation of the current output of said dynamic regulator between zero and maximum.

BIRNEY DYSART.

REFERENCES CITED

The following references are of record in the file of this patent:

UNITED STATES PATENTS

| Number | Name | Date |
|---|---|---|
| 2,130,517 | Wilson | Sept. 20, 1938 |
| 2,178,333 | Blair | Oct. 31, 1939 |